W. L. FISH.
Sewing Machine.
No. 9,725. Reissued May 31, 1881.
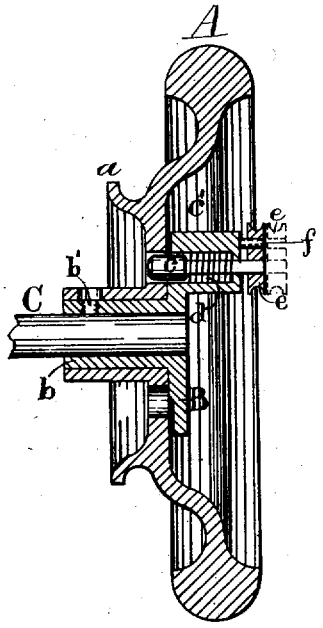
Attest:
T. S. Crane.
N. G. Breath.
Inventor.
Warren L. Fish.
By Oliver Drake, Att'y.
N. PETERS, Photo-Lithographer, Washington, D. C.

UNITED STATES PATENT OFFICE.

WARREN L. FISH, OF NEWARK, NEW JERSEY.

SEWING-MACHINE.

SPECIFICATION forming part of Reissued Letters Patent No. 9,725, dated May 31, 1881.

Original No. 167,515, dated September 7, 1875. Application for reissue filed January 28, 1879.

*To all whom it may concern:*

Be it known that I, WARREN L. FISH, of Newark, in the county of Essex and State of New Jersey, have invented a new and useful Improvement in Sewing-Machines, of which the following is a full, clear, and exact description, such as will enable others skilled in the art to which it appertains to make and use the same, reference being had to the accompanying drawing, and to the letters of reference thereon, which forms a part of this specification.

The object of this invention is to operate the bobbin-winder of a sewing-machine while the sewing mechanism remains motionless, and vice versa, by means of one and the same pulley, without having said pulley or the fly-wheel revolve directly upon the shaft which supports them and which drives the sewing mechanism, whereby said shaft is relieved from the wear which would otherwise result.

An important advantage in the application of this improvement is that the change required in the construction of a sewing-machine is attended with but little or no expense, and it is adapted to be applied to many of the standard machines now in use or being manufactured with but little alteration in the parts thereof other than simply enlarging the holes through the centers of their fly wheels or pulleys.

The accompanying drawing illustrates the nature and character of the invention, it being a vertical longitudinal section of a fly-wheel and pulley, showing, also, a portion of the shaft which operates the sewing mechanism, and will be hereinafter more fully set forth.

The improvement consists in the combination and arrangement of parts hereinafter described, and set forth in the claims.

In practically carrying out my invention the main or driving shaft C, which operates the sewing mechanism, is provided with a closely-fitting sleeve, *b*, and flange or collar B, the two parts being integral and rigidly affixed to said shaft. A pulley and fly wheel, A *a*, are loosely adjusted and capable of revolving on said sleeve, and prevented from removal therefrom by means of said flange; and a device is provided for coupling and uncoupling said fly and pulley wheel and flange by and at the pleasure of the operator, whereby said shaft may be revolved both forward and backward in operating the sewing mechanism, and also remain stationary while the bobbin-winder is being operated, for which latter purpose the parts A *a* and B *b* must be uncoupled and the bobbin-winder pulley be brought into direct connection with the belt which drives the machine, or with the rim of the wheel, as the case may be, no change of the belt from one pulley to another being required, all substantially as indicated in the drawing, and as will be readily understood.

The flange B, which prevents, as already stated, the fly and pulley wheel from accidentally slipping off from said sleeve, presents a broad surface against the face of said fly and pulley wheel, thereby securing to the latter a uniform and steady motion, and also affords a convenient support for the coupling or locking device which is attached thereto, as shown.

The said locking device consists in the combination, with said flange or collar B and wheel A *a*, of a pin, *c*, which is adjusted in a socket or cylinder, *c'*, and engages with the fly and pulley wheel A *a*, the face of which is perforated, as shown, to receive it, said pin being forced into said perforation by means of a spring, *d*, coiled around said pin in said socket or cylinder, and bearing against a shoulder at the outer end thereof, and also against a shoulder formed on the pin, the action of said spring serving, also, to prevent the accidental uncoupling of the said parts.

The said coupling-pin *c* is provided with a suitable head, *e*, by which to draw it back in uncoupling, in which position it is held by means of a pin, *f*, attached to and projecting from the shell which forms the socket or cylinder *c'*, and bearing against the inner face of the head *e* when the latter is drawn back, as above stated, and slightly turned to the right or left, so as to be out of coincidence with a perforation or aperture in said head, into which said pin *f* enters when the parts are coupled, all as shown.

By means of this invention I am enabled to operate the sewing mechanism of a sewing-machine and the bobbin-winder attached thereto independently of each other with the same pulley without friction or wear upon the shaft, such as would result from the pulley or wheel revolving directly thereon, as heretofore, and to apply it to machines of different manufactures with equal facility and with but little, if any, alteration or change in any part or parts of such machines other than those already mentioned, or such as may be necessary to facilitate such application to the various machines in the market.

The flanged sleeve may be reversed in its position upon the shaft, and space afforded outside of the wheel for a screw by which to secure said sleeve to the shaft C.

Having thus described my invention, what I claim as new, and desire to secure by Letters Patent, is—

1. In a sewing-machine having a bobbin-winder, the combination, with the shaft C, which operates the sewing mechanism, and fly-wheel A, having a pulley, *a*, affixed thereto, of the sleeve *b*, provided with a flange or collar, B, the coupling-pin *c*, having a head, *e*, and pin *f*, the several parts being arranged and operating substantially as shown and described, for the purposes set forth.

2. In a sewing-machine provided with a bobbin-winder, the combination of the shaft which operates the sewing mechanism, a sleeve having a flange, forming an integral part thereof, rigidly affixed to said shaft, a pulley supported and capable of revolving on said sleeve, a pin adapted to couple and uncouple said pulley and flange, and means for holding said pin in position, whereby said shaft may be revolved both forward and backward when the parts are coupled, and remain motionless when uncoupled, substantially as and for the purposes set forth.

3. In a sewing-machine provided with a bobbin-winder, the combination of a shaft for operating the sewing mechanism, a sleeve and flange rigidly affixed to said shaft, a pulley supported and capable of revolving on said sleeve, and prevented from removal therefrom by said flange, and mechanism for coupling and uncoupling said pulley and flange, whereby said shaft may be revolved in both directions when the parts are coupled and remain motionless when uncoupled, the several parts being arranged and operating substantially as and for the purposes set forth.

4. In a sewing-machine provided with a bobbin-winder, the combination of a shaft for operating the sewing mechanism, a sleeve rigidly affixed to said shaft, a pulley supported and capable of revolving on said sleeve, and means for coupling and uncoupling said pulley and sleeve, substantially as and for the purposes set forth.

In testimony that I claim the foregoing I hereto subscribe my name in the presence of two witnesses.

WARREN L. FISH.

Witnesses:
OLIVER DRAKE,
C. A. BENSON.